United States Patent [19]
Nguyen et al.

[11] Patent Number: 5,982,161
[45] Date of Patent: Nov. 9, 1999

[54] VOLTAGE REGULATOR HAVING VARIABLE FREQUENCY-BASED CONTROL

[75] Inventors: Don J. Nguyen, Portland; Thovane Solivan, Hillsboro, both of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).
This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 09/185,786

[22] Filed: Nov. 4, 1998

Related U.S. Application Data

[63] Continuation-in-part of application No. 09/173,483, Oct. 14, 1998.

[51] Int. Cl.$^6$ ........................................ G05F 1/40
[52] U.S. Cl. .............................. 323/284; 323/288
[58] Field of Search ................................ 323/282, 283, 323/284, 285, 259

[56] References Cited

U.S. PATENT DOCUMENTS 5,745,352  4/1998  Sandri et al. ........................... 363/41
5,747,976  5/1998  Wong et al. ........................... 323/282

*Primary Examiner*—Shawn Riley
*Attorney, Agent, or Firm*—Trop, Pruner, Hu & Miles, P.C.

[57] ABSTRACT

A voltage regulator includes an energy storage element to produce an output voltage, a switch and a controller. The switch energizes and de-energizes the energy storage element at a switching frequency. The controller is coupled to the switch and receives an indication of the output voltage. The controller controls the switching frequency to regulate the output voltage based on the indication.

25 Claims, 9 Drawing Sheets

VOLTAGE REGULATOR HAVING VARIABLE FREQUENCY-BASED CONTROL

CROSS-REFERENCE TO RELATED APPLICATION

This is a continuation-in-part of U.S. patent application Ser. No. 09/173,483 that was filed on Oct. 14, 1998.

BACKGROUND

The invention generally relates to a voltage regulator, such as a switching voltage regulator.

A DC-to-DC voltage regulator typically is used to convert a DC input voltage to either a higher or a lower DC output voltage. One type of voltage regulator is a switching regulator which is often chosen due to its small size and efficiency. The switching regulator typically includes one or more switches that are rapidly opened and closed to transfer energy between an inductor (a stand-alone inductor or a transformer, as examples) and an input voltage source in a manner that regulates an output voltage.

As an example, referring to FIG. 1, one type of switching regulator is a synchronous Buck switching regulator 10 which receives an input DC voltage (called $V_{IN}$) and converts the $V_{IN}$ voltage to a lower regulated output voltage (called $V_{OUT}$) that appears at an output terminal 11. To accomplish this, the regulator 10 may include a switch 20 (a metal-oxide-semiconductor field-effect-transistor (MOSFET), for example) that is operated (via a voltage called $V_{SW}$) in a manner to regulate the $V_{OUT}$ voltage, as described below.

Referring also FIGS. 2 and 3, in particular, the switch 20 opens and closes to control energization/de-energization cycles 19 (each having a constant duration called $T_S$) of an inductor 14. In each cycle 19, the regulator 10 asserts, or drives high, the $V_{SW}$ voltage during an on interval (called $T_{ON}$) to close the switch 20 and transfer energy from an input voltage source 9 to the inductor 14. During the $T_{ON}$ interval, a current (called $I_L$) of the inductor 14 has a positive slope 17. During an off interval (called $T_{OFF}$) of the cycle 19, the regulator 10 deasserts, or drives low, the $V_{SW}$ voltage to open the switch 20 and isolate the input voltage source 9 from the inductor 14. At this point, the level of the $I_L$ current is not abruptly halted, but rather, a diode 18 begins conducting to transfer energy from the inductor 14 to a bulk capacitor 16 and a load (not shown) that are coupled to the output terminal 11. During the $T_{OFF}$ interval, the $I_L$ current has a negative slope, and the regulator 10 may close a switch 21 to shunt the diode 18 to reduce the amount of power that is otherwise dissipated by the diode 18. The bulk capacitor 16 serves as a stored energy source that is depleted by the load, and additional energy is transferred from the inductor 14 to the bulk capacitor 16 during each $T_{ON}$ interval.

For the Buck switching regulator, the ratio of the $T_{ON}$ interval to the $T_{OFF}$ interval, called a duty cycle, generally governs the ratio of the $V_{OUT}$ to the $V_{IN}$ voltages. Thus, to increase the $V_{OUT}$ voltage, the duty cycle may be increased, and to decrease the $V_{OUT}$ voltage, the duty cycle may be decreased.

The regulator 10 may include a controller 15 (see FIG. 1) that regulates the $V_{OUT}$ voltage by using a pulse width modulation (PWM) technique to control the duty cycle. In this manner, the controller 15 may include an error amplifier 23 that amplifies the difference between a reference voltage (called $V_{REF}$) and a voltage (called $V_P$ (see FIG. 1)) that is proportional to the $V_{OUT}$ voltage. The controller 15 may include a comparator 26 that compares the resultant amplified voltage (called $V_C$) with a sawtooth voltage (called $V_{SAW}$) and provides the $V_{SW}$ signal that indicates the result of the comparison. The $V_{SAW}$ voltage is provided by a sawtooth oscillator 25 and has a constant frequency (i.e., $1/T_S$).

As an example, due to the above-described arrangement, when the $V_{OUT}$ voltage increases, the $V_C$ voltage decreases and causes the duty cycle to decrease to counteract the increase in $V_{OUT}$. Conversely, when the $V_{OUT}$ voltage decreases, the $V_C$ voltage increases and causes the duty cycle to increase to counteract the decrease in $V_{OUT}$.

A problem with this arrangement is that when the power requirements of the load abruptly change, the regulator 10 may take a long time (3.3 microseconds (μs), for example) to respond, and as a result, the $V_{OUT}$ voltage may fall outside of a regulated range of values for this time interval. The time in which the $V_{OUT}$ voltage is unregulated, in turn, may decrease the power conversion efficiency of the regulator 10. Unfortunately, if the regulator 10 is used in a notebook computer, for example, this inefficiency may affect the battery life of the computer and may affect the internal temperature of the computer.

For purposes of decreasing the time for the regulator 10 to respond to transient load conditions, the size of the bulk capacitor 16 and the size of the inductor 14 may be increased. However, increasing the sizes of these components may significantly increase the size of the regulator 10.

Thus, there is a continuing need for a voltage regulator that responds more quickly to transient load conditions. There is also a continuing need for a voltage regulator that has a more compact size.

SUMMARY

In one embodiment, a method for use with a voltage regulator includes cycling energy through an energy storage element at a switching frequency. An indication of an output voltage of the regulator is compared with at least one threshold. Based on the comparison, the switching frequency is regulated.

DETAILED DESCRIPTION

Figure 1:
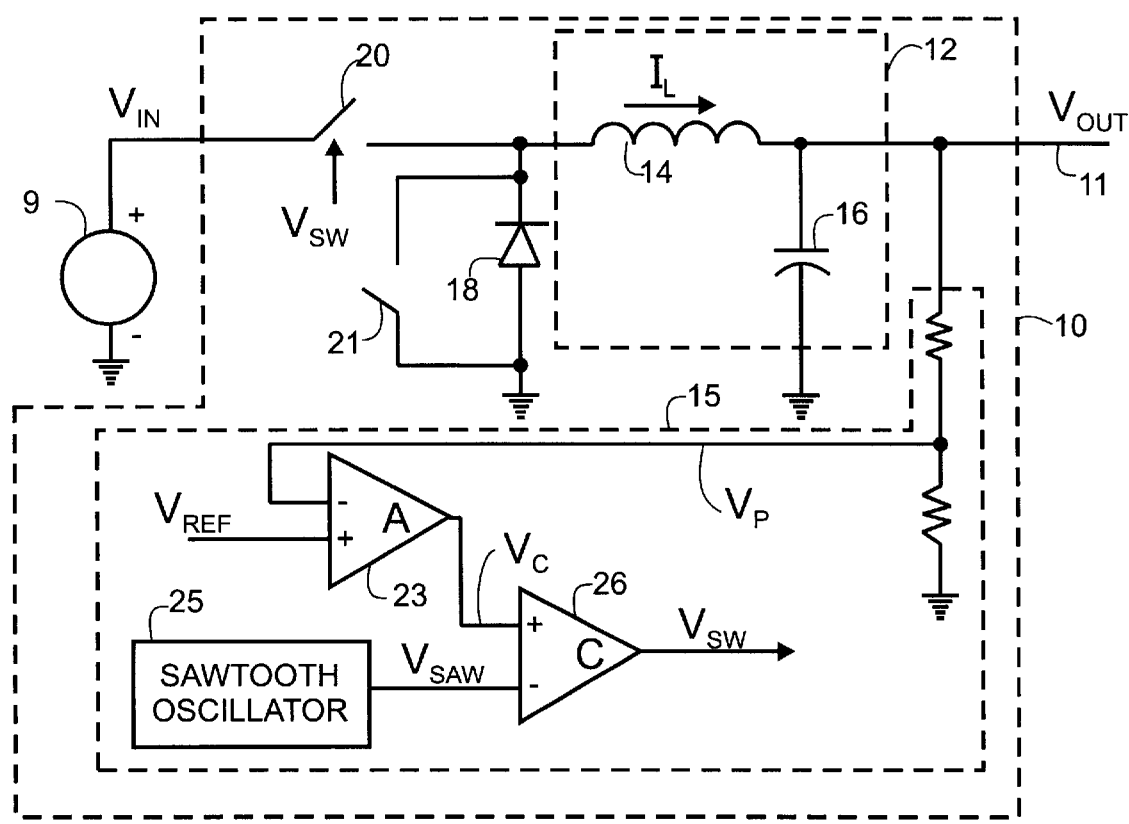
FIG. 1 is a schematic diagram of a switching voltage regulator of the prior art.
Figure 2:
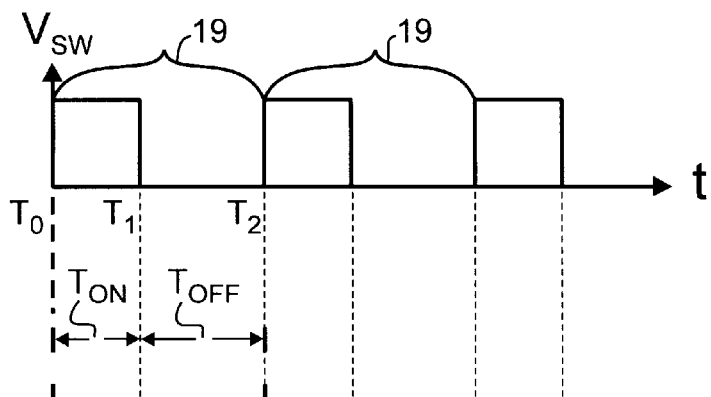
FIGS. 2, 3, 4 and 5 are voltage and current waveforms that illustrate operation of the regulator of FIG. 1.
Figure 3:
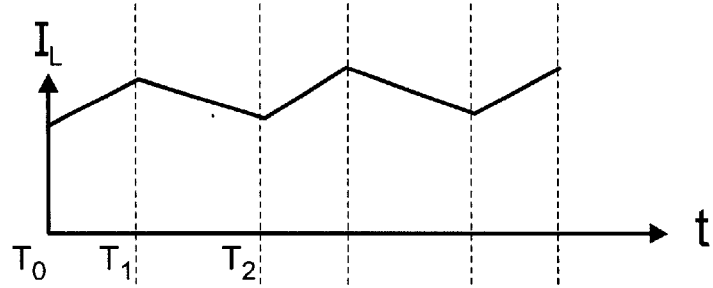
Figure 4:
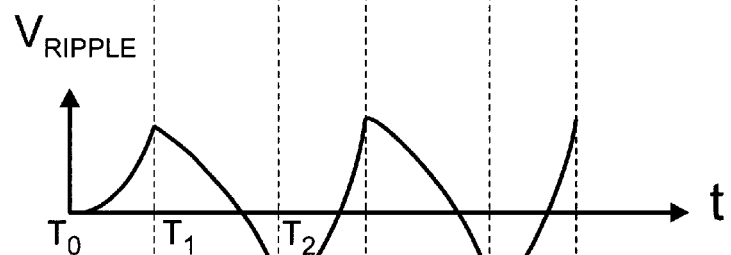
Figure 5:
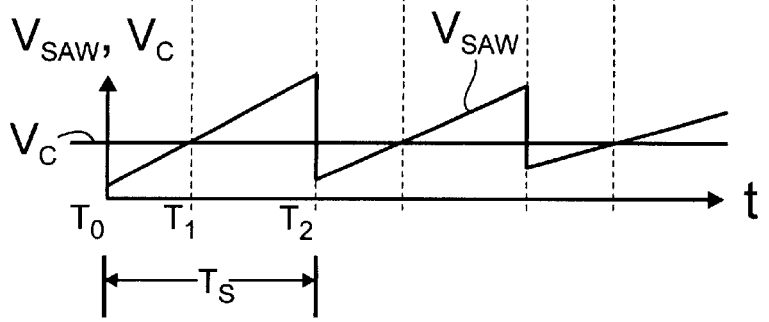
Figure 6:
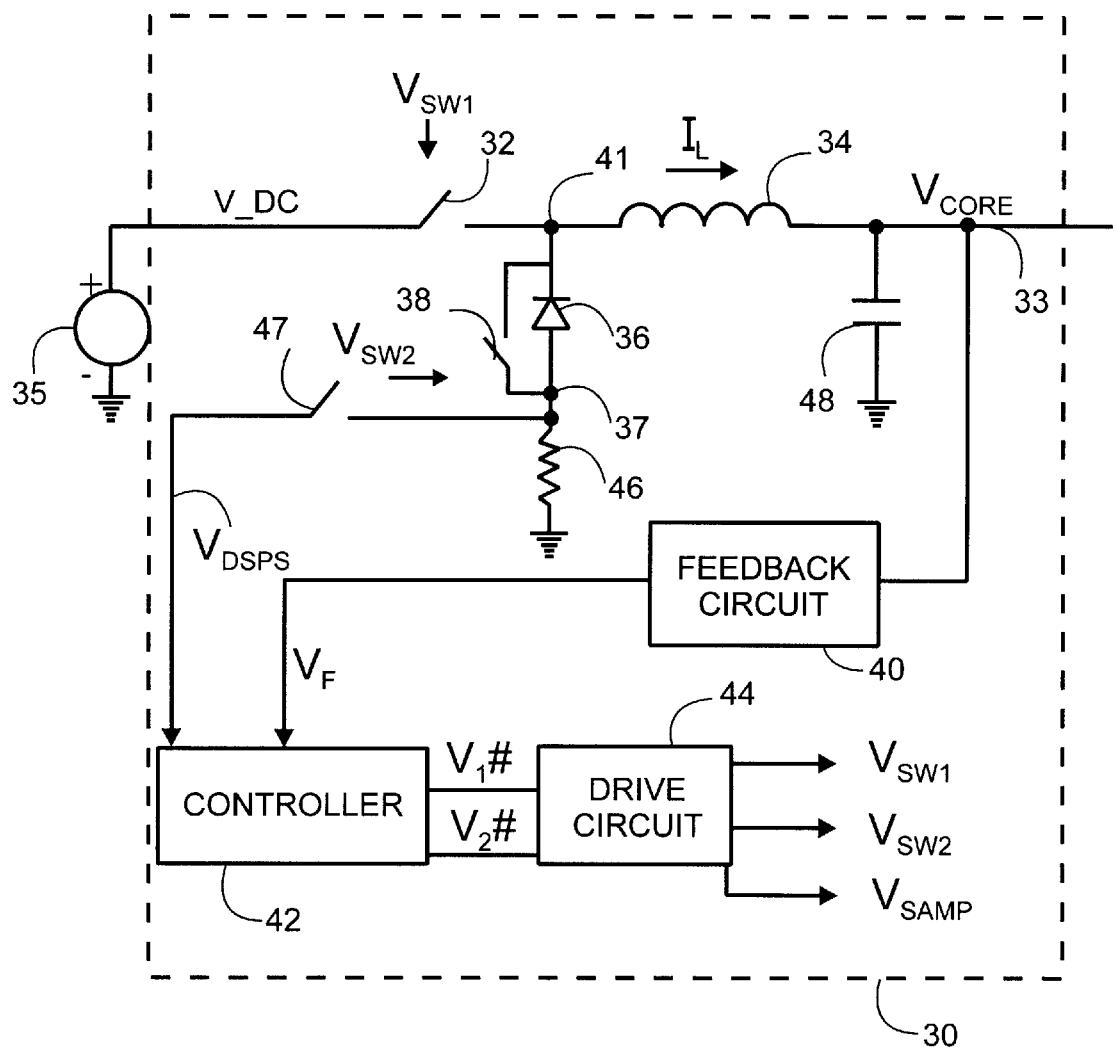
FIG. 6 is a schematic diagram of a switching voltage regulator according to an embodiment of the invention.
Figure 7:
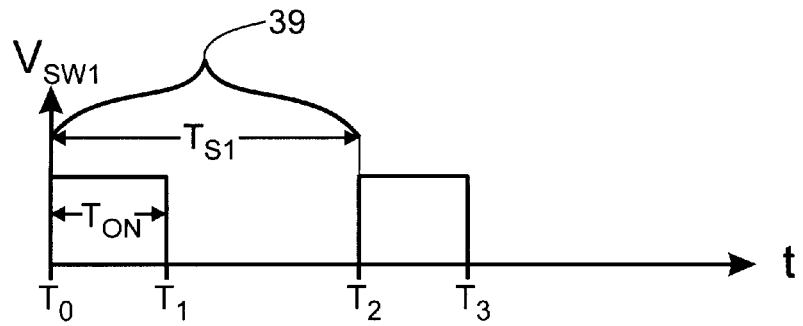
FIGS. 7, 8, 9, 10, and 11 are voltage and current waveforms that illustrate operation of the regulator of FIG. 6 without transient load conditions.
Figure 8:
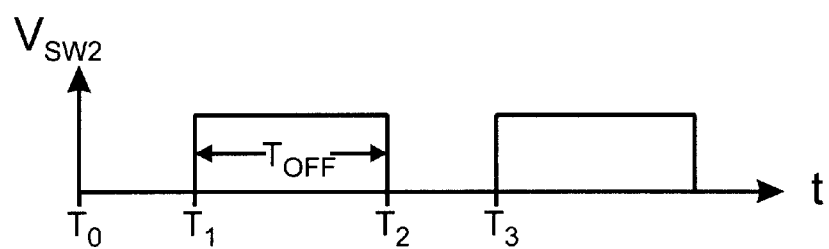

Referring to FIG. 6, an embodiment 30 of a synchronous switching Buck regulator in accordance with the invention includes an inductor 34 that is selectively energized and de-energized to regulate an output voltage (called $V_{CORE}$) that appears at an output terminal 33. To accomplish this, the regulator 20 may include a controller 42 that interacts with a drive circuit 44 to generate non-overlapping switching voltages called $V_{SW1}$ and $V_{SW2}$ (see also FIGS. 7 and 8) that control operations of switches 32 and 38, respectively. In this manner, the controller 42 may close the switch 32 to couple an input voltage source 35 (that provides an input voltage called V_DC) to the inductor 34 to transfer energy to the inductor 34, and the controller 42 may close the switch 38 to provide a path for transferring energy from the inductor 34 to the output terminal 33. A bulk capacitor 48 may store part of the energy that is transferred from the inductor 34 and help regulate the $V_{CORE}$ voltage.

A typical controller may operate the switches 32 and 38 at a fixed switching frequency and regulate a duty cycle of the switching based on a monitored level of the $V_{CORE}$ voltage. However, unlike the typical controller, the controller 42 regulates the $V_{CORE}$ voltage by monitoring an indication (provided by a voltage called $V_F$ that is proportionate to the $V_{CORE}$ voltage, for example) of the $V_{CORE}$ voltage and controlling the frequency of the switching based on this indication.

The advantages of regulating a switching frequency based on an observed output voltage may include one or more of the following: the regulator's response to transient load conditions may be enhanced; the size of the inductor may be decreased; the size of the bulk capacitor may be decreased; and less power may be dissipated.

In some embodiments, the controller 42 interacts with the drive circuit 44 by generating voltages called $V_1\#$ and $V_2\#$ (wherein the suffix "#" denotes negative, or inverse logic) that the drive circuit 44 receives and converts into the $V_{SW1}$ and $V_{SW2}$ voltages, respectively. Although the $V_{SW1}$ and $V_{SW1}$ voltages generally indicate the inverse of the $V_1\#$ and $V_2\#$ voltages, respectively, the drive circuit 44 prevents the $V_{SW1}$ and $V_{SW2}$ voltages from overlapping to keep the regulator 30 functioning properly. To accomplish this, the drive circuit 44, as further described below, includes circuitry to prevent one of the switching voltages $V_{SW1}$ or $V_{SW2}$ from being asserted while the other voltage $V_{SW1}$ or $V_{SW2}$ is asserted.

Figure 10:
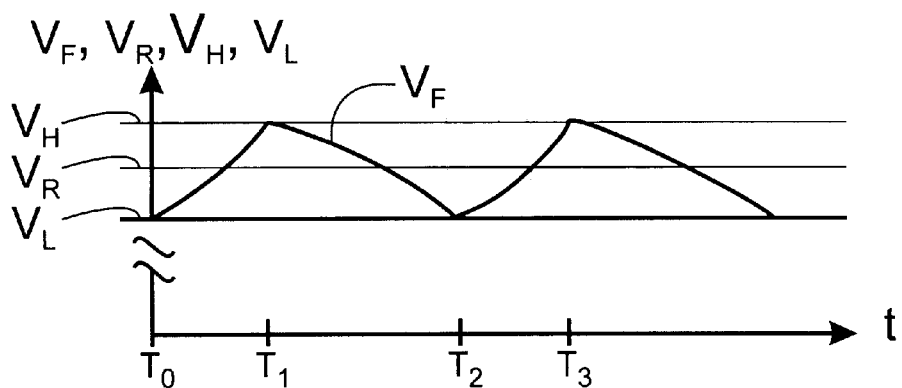
Figure 11:
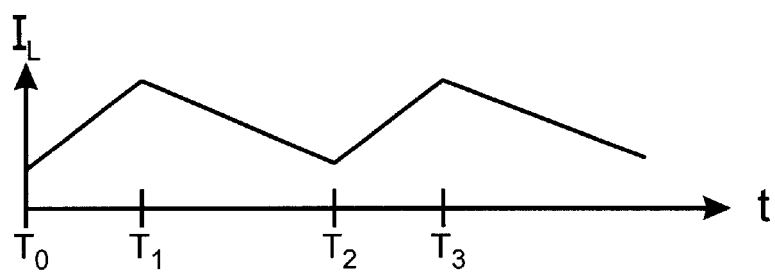

In some embodiments, to regulate the switching frequency, the controller 42 regulates a ripple voltage component that is present in the $V_{CORE}$ voltage. Referring also to FIG. 10 in this manner, the controller 42 monitors the $V_F$ voltage, and in response, the controller 42 operates the switches 32 and 38 (via selective assertion of the $V_1\#$ and $V_2\#$ voltages) to keep the $V_F$ voltage between a high voltage threshold (called $V_H$) and a low voltage threshold (called $V_L$). This regulation, in turn, keeps the $V_{CORE}$ voltage within predetermined regulated limits (limits within 5% of a predetermined voltage level, for example).

Referring to FIGS. 7, 8, 10 and 11, the controller 42 regulates the switches 32 and 38 in the following manner for an exemplary energization/de-energization cycle 39 that lasts from time $T_0$ to time $T_2$. First, the controller 42 interacts with the drive circuit 44 to assert (drive high, for example) the $V_{SW1}$ voltage at time $T_0$. The assertion of the $V_{SW1}$ voltage causes the switch 32 to close. Once this occurs, the $I_L$ current (see FIG. 11) has a positive slope, as energy is being stored in the inductor 34 from time $T_0$ to time $T_1$. Also during the interval from time $T_0$ to time $T_1$, the $V_F$ voltage rises upwardly from a low threshold voltage $V_L$ to the upper threshold voltage $V_H$. In this manner, at time $T_1$, the $V_F$ voltage reaches the upper threshold $V_H$. In response to this occurrence, the controller 42 interacts with the drive circuit 44 to deassert (drive low, for example) the $V_{SW1}$ voltage to open the switch 32.

The opening of the switch 32 begins an interval during which energy is transferred from the inductor 34 to the bulk capacitor 48. After the switch 32 opens, a diode 36 conducts the $I_L$ current and permits energy to be transferred from the inductor 34 to the output terminal 33. The $I_L$ circuit assumes a negative slope from time $T_1$ to $T_2$. A short time after the controller 42 deasserts the $V_{SW1}$ voltage, the controller 42 asserts the $V_{SW2}$ voltage to close the main current path of switch 38. This path, in turn, shunts the diode 36 which reduces the effective resistance path for the $I_L$ current and thus, reduces the power that is otherwise dissipated by the diode 36.

The controller 42 asserts the $V_{SW2}$ voltage during the interval from time $T_1$ to $T_2$ to allow energy to be transferred from the inductor 34 and causes the $V_F$ voltage (and the $V_{CORE}$ voltage) to decrease from the $V_H$ threshold to the $V_L$ threshold. When the $V_F$ voltage reaches the $V_L$ threshold at time $T_2$, this event causes the controller 42 to interact with the drive circuit 44 to deassert the $V_{SW2}$ voltage which, in turn, causes the switch 38 to open. A short time thereafter, the controller 42 closes the switch 32 to begin another energization/de-energization cycle.

Thus, the switching frequency and duty cycle are not constant, but rather, the controller 42 has variable control of these characteristics to accommodate changing load conditions. As an example, the waveforms shown in FIGS. 7, 8, 10 and 11 illustrate a scenario when the $V_{CORE}$ voltage stays within regulation (i.e., the proportionate $V_F$ voltage stays within the $V_H$ and $V_L$ limits) and no load transient load conditions occur. However, referring to FIGS. 12, 13, 14 and 15, a different scenario may occur in which the requirements of the load change rapidly and cause the $V_{CORE}$ voltage to undershoot or overshoot predetermined regulated limits. However, the controller 42, because of its variable frequency and duty cycle control, responds rapidly to this scenario, as described below.

Figure 12:
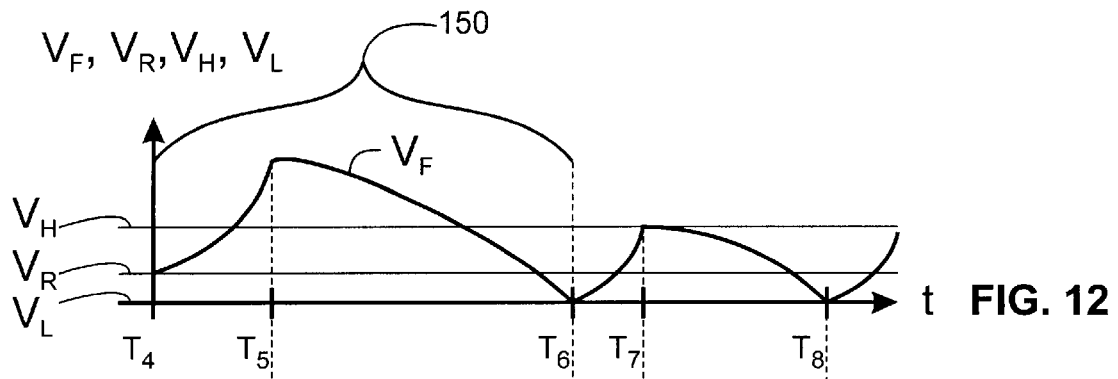
FIGS. 12, 13, 14 and 15 are voltage and current waveforms that illustrate operation of the regulator of FIG. 6 with transient load conditions.
Figure 13:
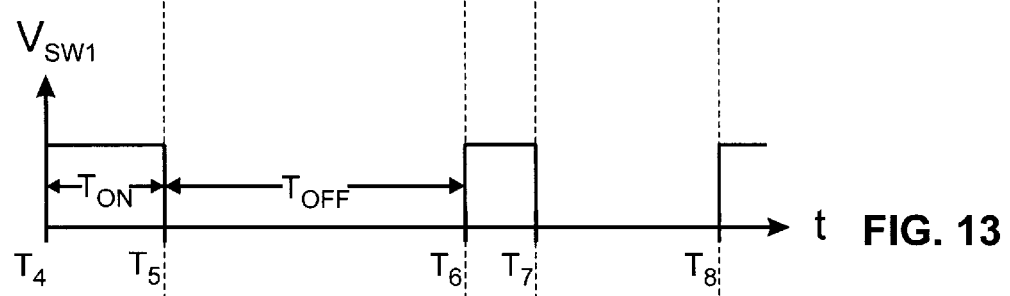
Figure 14:
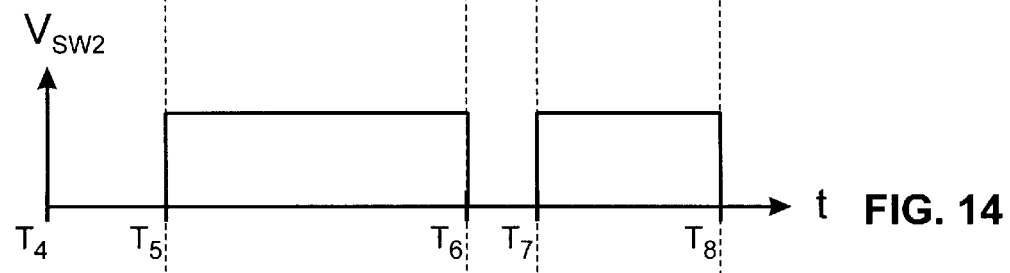
Figure 15:
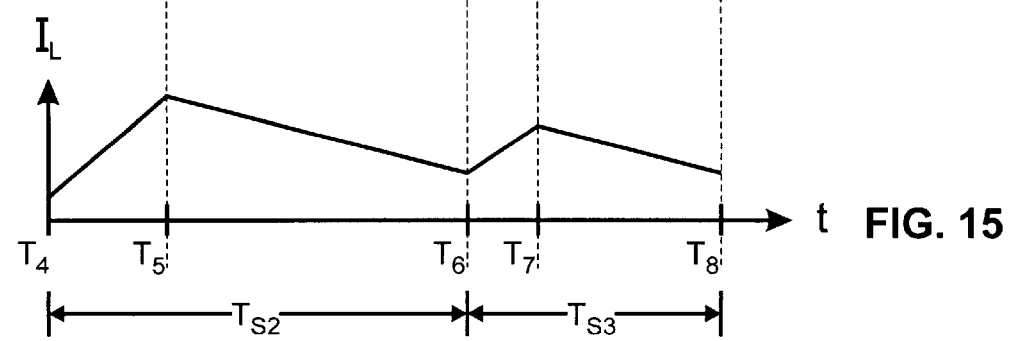

In particular, referring to FIG. 12, another exemplary power cycle 150 begins at time $T_4$. From time $T_4$ to time $T_5$, the $V_F$ voltage may rise to a voltage above the $V_H$ threshold. The controller 42 responds to this occurrence at time $T_5$ by interacting with the drive circuit 44 to deassert the $V_{SW1}$ voltage to open the switch 32. The opening of the switch 32 prevents additional energy from being transferred from the input voltage source 35 to the inductor 34. From time $T_5$ to time $T_6$, the $I_L$ current assumes a negative slope as energy is transferred from the inductor 34, an event which lowers the $V_{CORE}$ voltage. Because the $T_{OFF}$ time is variable, the $V_{CORE}$ voltage decreases back to the regulated range of values as shown from times $T_5$ to $T_6$. When the $V_F$ voltage drops to the $V_L$ threshold at time $T_6$, the controller 42 interacts with the drive circuit 44 to assert the $V_{SW1}$ voltage to once again close the switch 32 and cause the $V_{CORE}$ voltage to rise. Thus, due to the above-described mechanism, the $T_{OFF}$ time is variable, as the switch 32 stays closed for an appropriate time for regulation to occur. Conversely, in the opposite situation when a voltage droop (instead of a voltage surge) in the $V_{CORE}$ voltage occurs, the regulator 30 has a variable $T_{ON}$ time to allow additional energy to be transferred into the inductor 34 to raise the $V_{CORE}$ voltage and thus, bring the $V_{CORE}$ voltage back into regulation.

Figure 9:
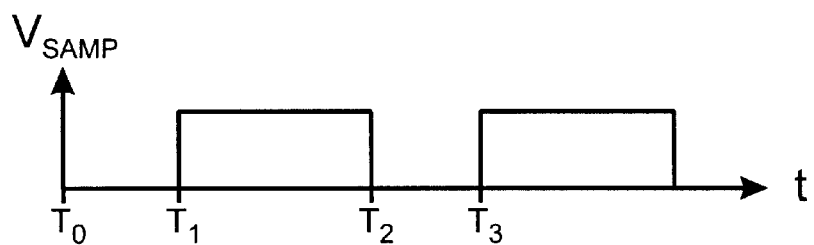

Referring back to FIG. 6, in some embodiments, the regulator 30 may include a current sensing resistor 46 that is coupled between a sampling node 37 and ground. The current sensing resistor 46 may also be coupled in series with the parallel combination of the diode 36 and the switch 38. The controller 42 samples a voltage (called $V_{DSPS}$) across the resistor 46 to sample an indication of an average $I_L$ current during the time when energy is being transferred from the inductor 34 to the output terminal 33. As described below, in some embodiments, the controller 42 uses the $V_{DSPS}$ voltage in addition to the $V_F$ voltage to regulate the $V_{CORE}$ voltage. To perform the sampling, the regulator 30 may include a switch 47 that is coupled between the sampling node 37 and the controller 42. The controller 42 may assert a voltage (the $V_{SW1}$ voltage, for example) during the $T_{OFF}$ time to close the switch 47 and sample the $V_{DSPS}$ voltage, as shown in FIG. 9.

Other features of the regulator 30 may include, in some embodiments, a feedback circuit 40 which receives the $V_{CORE}$ voltage and furnishes the proportionate $V_F$ voltage. The main current path of the switch 32 may be coupled between the input voltage source 35 and a node 41. The inductor 34 may be coupled between the output terminal 33 and the node 41. The bulk capacitor 48 may be coupled between the output terminal 33 and ground. For purposes of reducing the equivalent series resistance (ESR) of the bulk capacitor 48, the bulk capacitor 48 may be formed from a bank of several capacitors that are coupled in parallel. The anode of the diode 36 may be coupled to the sampling node 37, and the cathode of the diode 36 may be coupled to the node 41.

Figure 16:
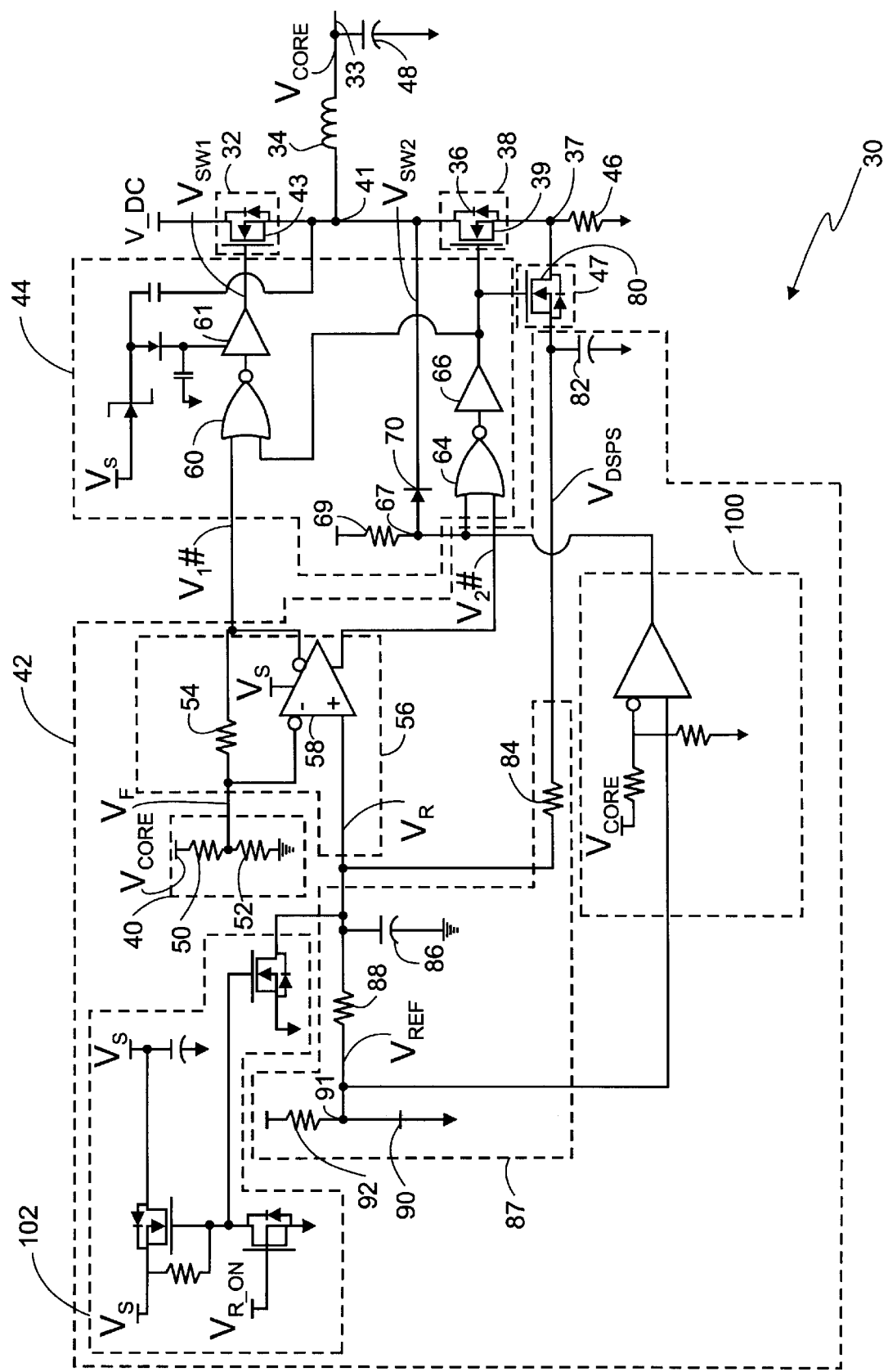
FIG. 16 is a more detailed schematic diagram of the regulator of FIG. 6 according to one embodiment of the invention.

Referring to FIG. 16, the controller 42 may include a hysteretic comparator circuit 56 which compares the $V_F$ voltage to the $V_H$ and $V_L$ thresholds to generate the $V_1\#$ and $V_2\#$ voltages. The $V_1\#$ and $V_2\#$ voltages, in turn, are used by the drive circuit 44 to generate the $V_{SW1}$ and $V_{SW2}$ voltages, respectively. In this manner, the circuit 56 may include a comparator 58 (a comparator with a 10 nanosecond (ns) propagation delay, for example) that furnishes the $V_1\#$ voltage at an inverting output terminal and furnishes the $V_2\#$ voltage at a non-inverting output terminal. The circuit 56 is coupled to the feedback circuit 40 that is formed from resistors 50 and 52 that are coupled together at the inverting input terminal of the comparator 58. The inverting input terminal, in turn, receives the $V_F$ voltage. A resistor 54 is coupled between the inverting input and output terminals of the comparator 58 to establish the $V_L$ and $V_H$ thresholds. The non-inverting input terminal of the comparator 58 receives a reference voltage (called $V_R$) which may be located approximately midway between the $V_H$ and $V_L$ thresholds, as shown in FIG. 10. As described below, the $V_R$ voltage is indicative of the power output of the regulator 30.

Thus, due to the above-described arrangement, in some embodiments, the comparator 58 drives low the $V_1\#$ voltage when the $V_F$ voltage decreases below the $V_L$ threshold and drives high the $V_1\#$ voltage when the $V_F$ voltage rises above the $V_H$ threshold. Conversely, in some embodiments, the comparator 58 drives low the $V_2\#$ voltage when the $V_F$ voltage rises above the $V_H$ threshold and drives high the $V_2\#$ voltage when the $V_F$ voltage decreases to the $V_L$ threshold.

The drive circuit 44 may also include circuitry to prevent the $V_{SW1}$ and the $V_{SW2}$ voltages from being concurrently asserted. In this manner, the driver circuit 44 may include a NOR gate 60 that has its output terminal coupled to the input terminal of a driver 61. The output terminal of the driver 61, in turn, furnishes the $V_{SW1}$ voltage. Thus, the $V_{SW1}$ voltage follows the output voltage provided by the NOR gate 60.

One input terminal of the NOR gate 60 receives the $V_1\#$ voltage, and another input terminal of the NOR gate 60 receives the $V_{SW2}$ voltage. Therefore, the driver 61 asserts the $V_{SW1}$ voltage only when the $V_1\#$ voltage is asserted and the $V_{SW2}$ voltage is deasserted.

For purposes of generating the $V_{SW2}$ voltage, the driver circuit 44 includes a NOR gate 64 that has its output terminal connected to the input terminal of a driver 66. The output terminal of the driver 66, in turn, furnishes the $V_{SW2}$ voltage. The NOR gate 64 has one input terminal that receives the $V_{S2}\#$ voltage, and another input terminal of the NOR gate 64 is coupled to a node 67. When the switch 32 is closed, a pullup resistor 69 couples the node 67 (and the corresponding input terminal of the NOR gate 64) to a logic one voltage level which causes the driver 66 to deassert the $V_{SW2}$ voltage. However, when the diode 36 begins to conduct, a diode 70 conducts which pulls the voltage level of the node 67 to ground and thus, deasserts the corresponding input terminal of the NOR gate 64. The cathode of the diode 70 is coupled to the cathode of the diode 36, and the anode of the diode 70 is coupled to the node 67. The other input terminal of the NOR gate 64 receives the $V_2\#$ voltage. Thus, when the node 67 is pulled to ground, the $V_{SW2}$ voltage indicates the $V_2\#$ voltage. Therefore, once the diode 36 conducts, the assertion of the $V_2\#$ voltage causes the driver 66 to assert the $V_{SW2}$ voltage.

In some embodiments, the switch 32 may include a metal-oxide-semiconductor field-effect-transistor (MOSFET) 43 which has its drain arranged to receive the V_DC voltage and its source coupled to the node 41. The gate of the MOSFET 43 receives the $V_{SW1}$ voltage. The switch 38 may include a MOSFET 39 which has its drain coupled to the node 41 and its source coupled to the node 37. The gate of the MOSFET 39 receives the $V_{SW2}$ voltage. The diode 36 may be an intrinsic diode of the MOSFET 39, for example.

In some embodiments, the regulator 30 may supply power to components of a computer system 200 (see FIG. 19), such as a notebook or desktop computer, and the computer system 200 may be capable of entering a power conservation mode, such as a stop clock mode, to conserve power. Referring back to FIG. 16, in this manner, for purposes of limiting the amount of power that is dissipated by the computer system 200 when the computer system 200 is not in the power conservation mode (i.e., when the computer system 200 is in a higher power consumption state), the regulator 30 may lower the $V_{CORE}$ voltage. In some embodiments, the regulator 30 lowers the $V_{CORE}$ in response to an increase in the $V_R$ voltage, an event that indicates the computer system 200 is not in the power conservation mode.

In particular, in some embodiments, the regulator 30 may include a sampling circuit 87 to dynamically adjust the level of the $V_R$ reference voltage based on the sampled $V_{DSPS}$ voltage. In this manner, the $V_{DSPS}$ voltage indicates an average level of the $I_L$ current. During the power conservation mode, less power is required and thus, the average level of the $I_L$ current decreases. Because the $V_{DSPS}$ voltage indicates the average $I_L$ current, the $V_{DSPS}$ voltage decreases during the power conservation mode and, in turn, increases the level of the $V_R$ voltage due to the following relationship:

$$V_R = (V_{REF} - V_{DSPS}) \cdot \left(\frac{R_{84}}{R_{84} + R_{88}}\right) + V_{DSPS},$$

where $R_{84}$ and $R_{88}$ represent the resistances of resistors 84 and 88, respectively, and $V_{REF}$ represents a reference voltage. The upward adjustment of the $V_R$ voltage during the power conservation mode upwardly adjusts the $V_{CORE}$ voltage. Conversely, the $V_R$ voltage decreases when the computer system 200 is not in the power conservation mode, an event which causes a downward adjustment in the $V_{CORE}$ voltage.

The switch 47 may include a MOSFET 80 that has its drain coupled to the node 37 and its source serially coupled to one terminal of a resistor 84. The other terminal of the resistor 84, in turn, may be coupled to the non-inverting input of the comparator 58. A sampling capacitor 82 is coupled between the source of the MOSFET 80 and ground. The sampling capacitor 82 stores a charge that indicates the $V_{DSPS}$ voltage. The sampling circuit 87 may also include a capacitor 86 that is coupled between the non-inverting input of the comparator 58 and ground. A resistor 88 is coupled between a non-inverting input of the comparator 58 and a node 91. The node 91, in turn, provides the $V_{REF}$ voltage. A resistor 92 is coupled between the node 91 and a positive voltage supply, and a Zener diode 90 has its cathode coupled to the node 90 and its anode coupled to the ground. In this manner, at powerup, the Zener diode 90 establishes the $V_{REF}$ voltage.

Other features of the regulator 30 may include another hysteretic comparator circuit 100 that monitors the $V_{CORE}$ voltage to determine if the $V_{CORE}$ voltage surpasses a maximum threshold voltage which is indicated by the $V_F$ voltage surpassing the $V_H$ threshold. When this occurs, the output terminal of the hysteretic comparator circuit 100 pulls the node 67 to ground which causes the driver circuit 44 to close the switch 36 and thus, cause the $V_{CORE}$ voltage to decrease.

In some embodiments, the regulator 30 may also include a powerup circuit 102 to hold the $V_R$ voltage to ground during powerup. The end of powerup may be indicated by the assertion of a $V_{R-ON}$ voltage. When powerup has occurred, then the circuit 102 decouples itself from the non-inverting input terminal of the comparator 58, and allows the circuitry to behave as described above.

Figure 17:
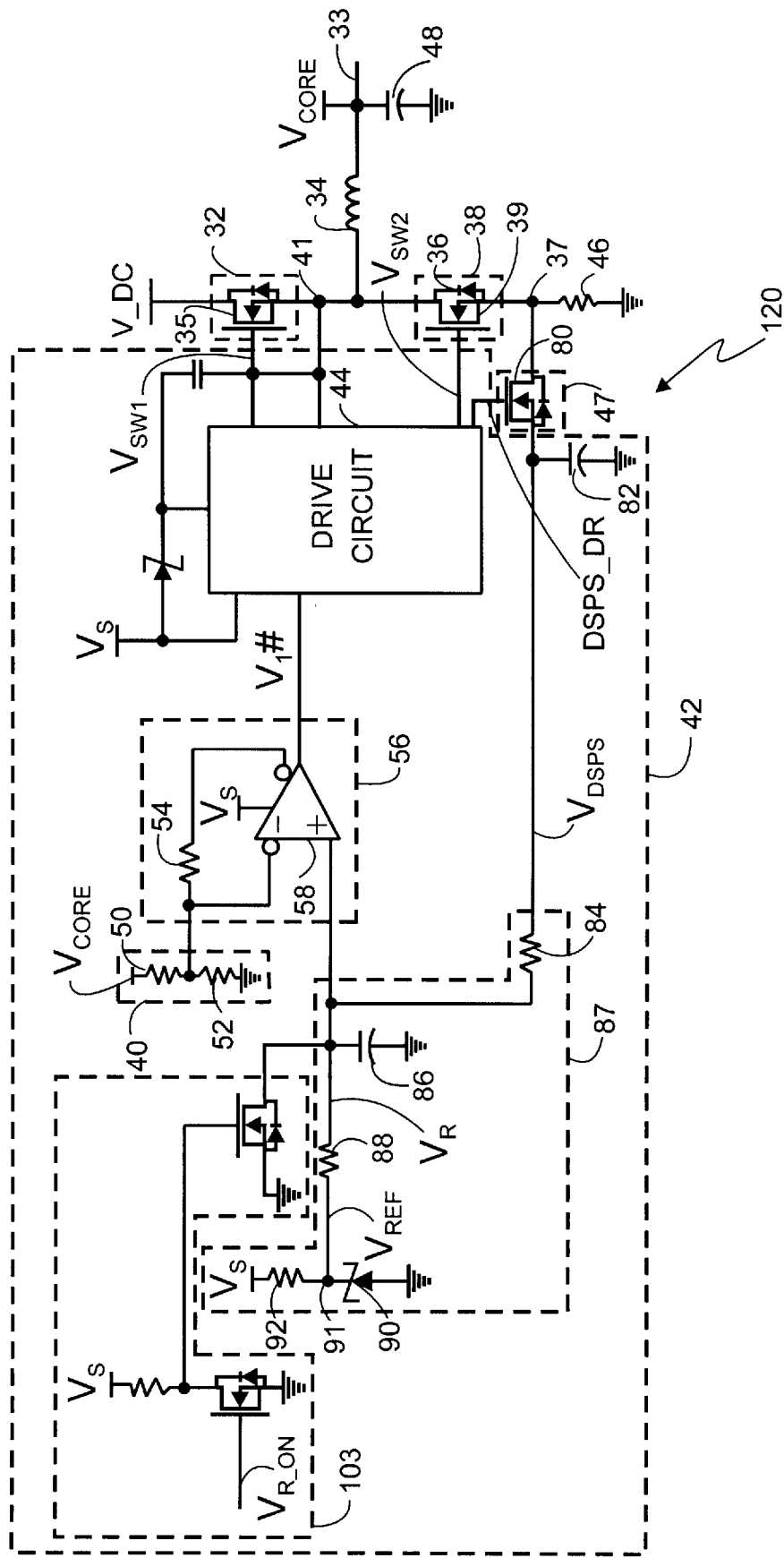
FIG. 17 is a more detailed schematic diagram of the regulator of FIG. 6 according to another embodiment of the invention.

Referring to FIG. 17, in some embodiments, the regulator 30 may be replaced by a regulator 120 which has similar features to the regulator 30. However, the regulator 120 may have some differences to enhance the performance of the regulator 120 during the power conservation mode. In particular, the switching losses introduced by the on-off transitions of the switches become significant during the power conservation mode as compared to the total amount of power being used by the computer. Therefore, for purposes of maximizing the efficiency of the regulator during the power conservation mode, the switches 38 and 47 may not be rapidly opened and closed, but rather, the switches 38 and 47 may be left opened during the power conservation mode. In this manner, although the switches 38 and 47 are not operative during the power conservation mode, the switch 32 may still be operated to regulate the $V_{CORE}$ voltage in a manner similar to a non-synchronous Buck converter. A typical way to accomplish this result is to drive both the switches 38 and 47 with the same switching voltage, such as the case of the regulator 30 that uses the $V_{SW2}$ voltage to operate both of the switches 38 and 47.

However, it has been discovered that the power conservation mode may last for a time that is sufficient to substantially deplete the charge stored on the sampling capacitor 82 if the switch 47 is left open during the power conservation mode. The depletion of charge from the sampling capacitor 82 causes the $V_R$ voltage to be set to an incorrect level and thus, causes the $V_{CORE}$ voltage to decrease to an incorrect voltage level.

Unlike the regulator 30, the regulator 120 does not open the switch 47 during the power conservation mode. Instead, the regulator 120 closes the switch 47 for substantially the entire duration of the power conservation mode and does not rapidly open and close the switch 47 during the power conservation mode which minimizes switching losses. By coupling the sampling capacitor 82 to the $V_R$ voltage during the power conservation mode, the regulator 80 maintains the correct voltage on the sampling capacitor 82 and thus, maintains the $V_{CORE}$ voltage at the appropriate level.

Figure 18:
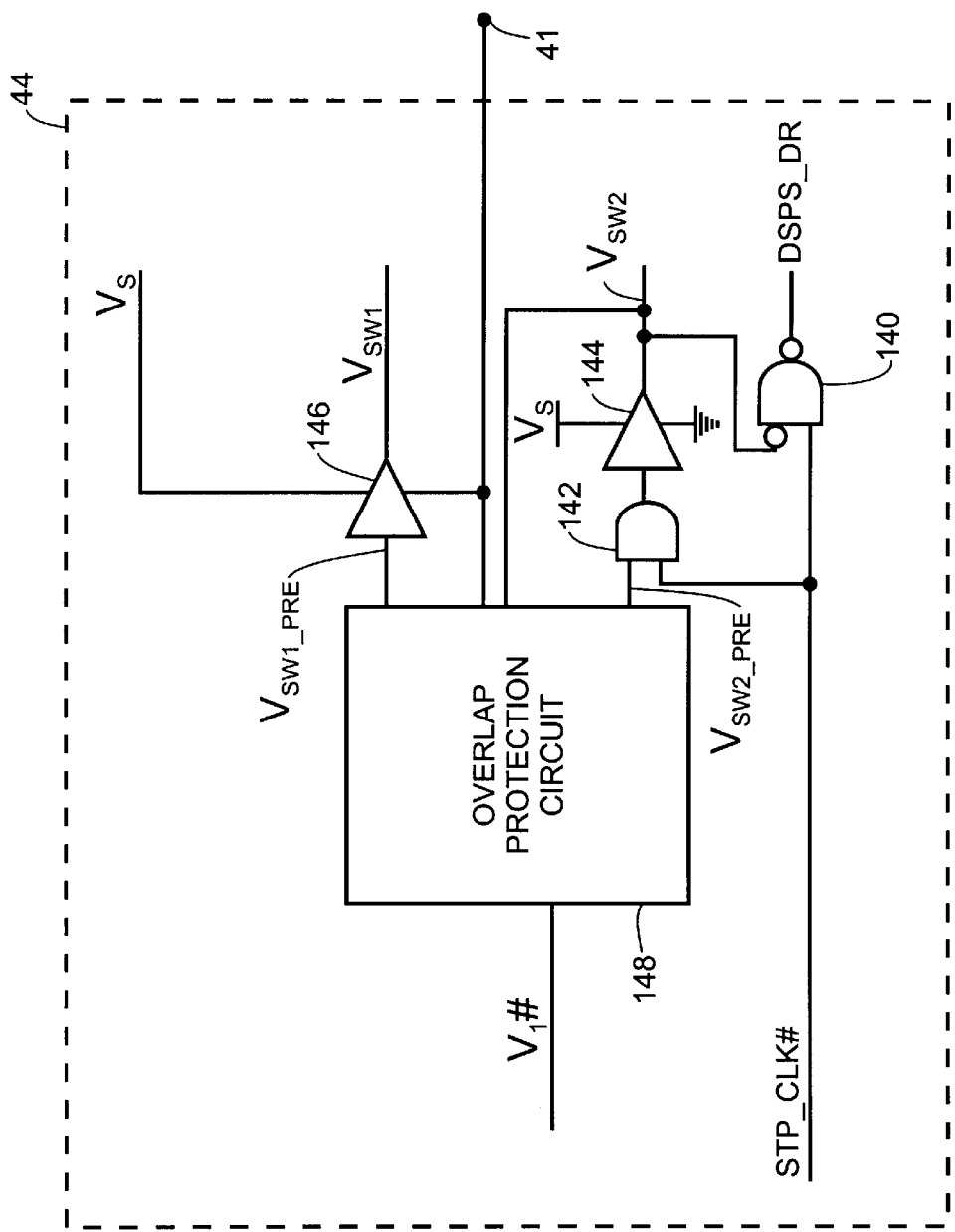
FIG. 18 is a schematic diagram of the driver circuit of FIG. 17.

Referring to FIG. 18, to accomplish the above-described features, the regulator 120 may include a drive circuit 130 that replaces the drive circuit 44. The drive circuit 130 includes a driver 144 that furnishes the $V_{SW2}$ voltage at its output terminal. An inverted indication of the $V_{SW2}$ voltage is received at an input terminal of a NAND gate 140. Another input terminal of the NAND gate 140 receives a STP_CLK# signal which is asserted (driven low, for example) to indicate the power conservation mode and deasserted, or driven high, otherwise. The output terminal of the NAND gate 140 furnishes a DSPS_DR signal that is received by the gate of the MOSFET 80 (see FIG. 17). Therefore, as a result of this arrangement, when the computer system 200 is in the power conservation mode, the NAND gate 140 asserts the DSPS_DR signal to cause the sampling transistor 80 to conduct, and when the computer system 200 is not in the power conservation mode, the state of the DSPS_DR signal closely follows the state of the $V_{SW2}$ voltage.

The drive circuit 130 may also include an overlap protection circuit 148 that uses the $V_1\#$ voltage to generate two non-overlapping voltages called $V_{SW1-PRE}$ and $V_{SW1-PRE}$. The $V_{SW1-PRE}$ voltage generally follows the complement of the $V_1\#$ voltage, and the $V_{SW2-PRE}$ voltage generally follows the $V_1\#$ voltage. A driver 146 receives the $V_{SW1-PRE}$ voltage and furnishes the $V_{SW1}$ voltage. An AND gate 142 receives the $V_{SW2-PRE}$ voltage and the STP_CLK# voltage. The output terminal of the AND gate 142 is coupled to an input terminal of the driver 144, and the output terminal of the driver 144 furnishes the $V_{SW2}$ voltage. In this manner, when the computer system 200 is not in the power conservation mode (i.e., when the STP_CLK# signal is deasserted), the $V_{SW2}$ voltage follows the $V_{SW2-PRE}$ voltage. However, when the computer system 200 is in the power conservation mode (i.e., when the STP_CLK# signal is asserted), the $V_{SW2}$ voltage is deasserted.

Figure 19:
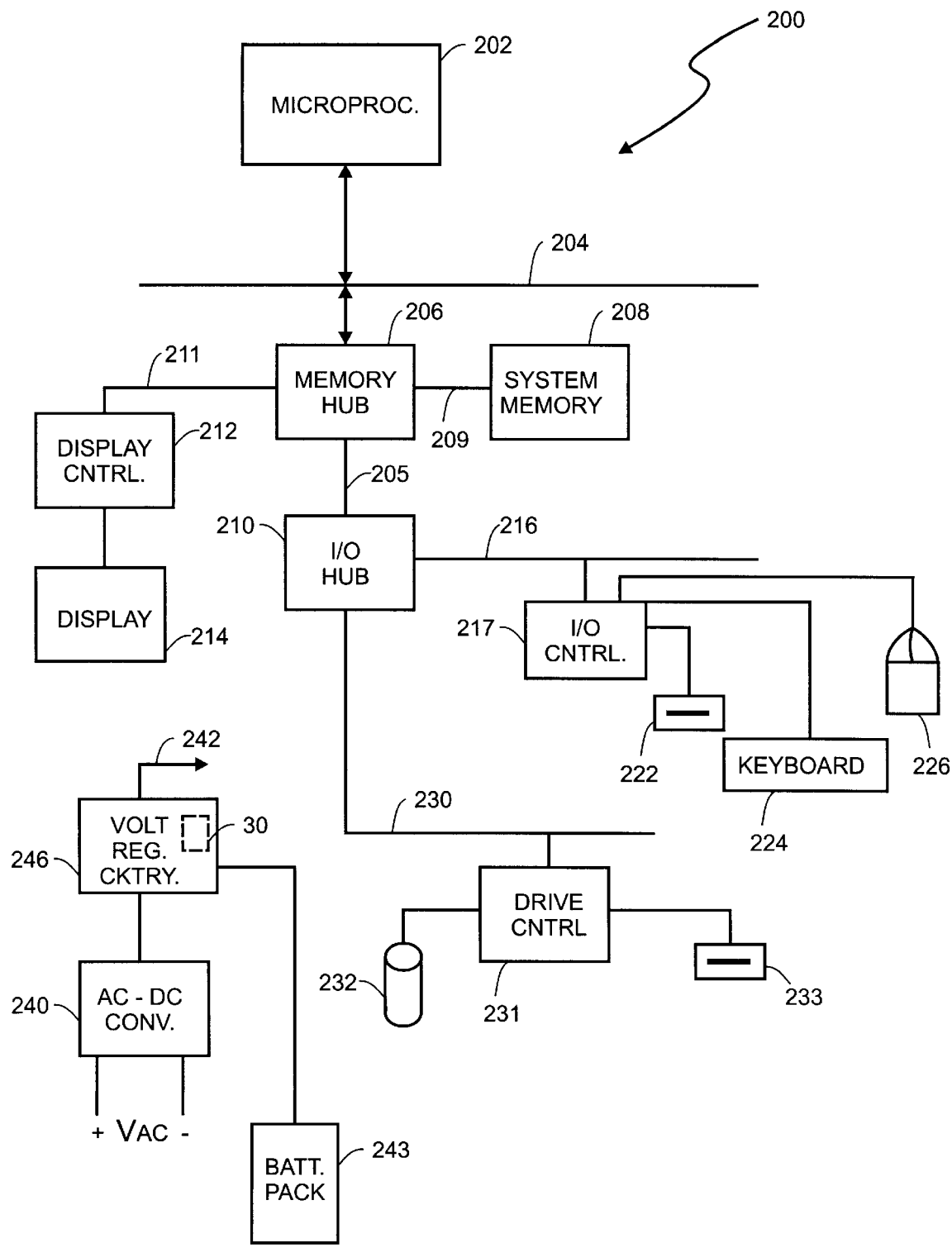
FIG. 19 is a schematic diagram of a computer system.

Referring to FIG. 19, the regulator 30, 130 may be part of voltage regulator circuitry 246 of the computer system 200. The voltage regulation circuitry 246 provides power to components of the computer system 200 via power lines 242. In addition to the voltage regulation circuitry 246, the computer system 200 may also include an AC-to-DC converter 240 that may receive an AC wall voltage and convert the AC voltage into a DC voltage that is provided to the voltage regulation circuitry 246. The voltage regulation circuitry 246 may also receive a DC voltage from a battery pack 243 that furnishes power when AC power is unavailable.

Among the components that consume power, the computer system 200 may include a microprocessor 202 and a bridge circuit, or memory hub 206, both of which are coupled to a front side bus 204. The memory hub 206 may interface the front side bus 204, a memory bus 209 and an Accelerated Graphics Port (AGP) bus 211 together. The AGP is described in detail in the Accelerated Graphics Port Interface Specification, Revision 1.0, published on Jul. 31, 1996, by Intel Corporation of Santa Clara, Calif. A system memory 208 may be coupled to the memory bus 209, and a display controller 212 (that controls a display 214) may be coupled to the AGP bus 211. A hub communication link 205 may couple the memory hub 206 to another bridge circuit, or input/output (I/O) hub 210.

The I/O hub 210 includes interfaces to an I/O expansion bus 216 and a Peripheral Component Interconnect (PCI) bus 230. The PCI Specification is available from The PCI Special Interest Group, Portland, Oreg. 97214. An I/O controller 217 may be coupled to the I/O expansion bus 216 and receive input data from a keyboard 224 and a mouse 226, as examples. The I/O controller 217 may also control operations of a floppy disk drive 222. A drive controller 231 may be coupled to the PCI bus 230. The drive controller 231 may control operations of a hard disk drive 232 and a CD-ROM drive 233, as examples.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A voltage regulator comprising:
   an energy storage element to produce an output voltage;
   at least one switch to energize and de-energize the energy storage element pursuant to switching cycles, each switching cycle including an on time interval during which said at least one switch operates to energize the energy storage element and an off time interval during which said at least one switch operates to de-energize the energy storage element; and
   a controller coupled to said at least one switch and adapted to:
      receive an indication of the output voltage, and
      regulate both a duration of the on time interval and a duration of the off time interval based on the indication of the output voltage without referencing a switching signal having a predefined frequency.

2. The voltage regulator of claim 1, wherein the controller comprises:
   a comparator to compare the indication to at least one threshold and generate a signal to control the switch based on the comparison.

3. The voltage regulator of claim 2, wherein said at least one threshold comprises an upper threshold indicative of a desired maximum voltage level for the output voltage.

4. The voltage regulator of claim 3, wherein the signal controls said at least one switch to energize the energy storage element when the output voltage is above the desired maximum voltage level.

5. The voltage regulator of claim 2, wherein said at least one threshold comprises a lower threshold indicative of a desired minimum voltage level for the output voltage.

6. The voltage regulator of claim 5, wherein the signal controls said at least one switch to de-energize the energy storage element when the output voltage is below the desired minimum voltage level.

7. The voltage regulator of claim 2, further comprising:
   a circuit to sample a current in the energy storage device to furnish said at least one threshold.

8. The voltage regulator of claim 2, wherein the comparator comprises:
   a hysteretic comparator.

9. The voltage regulator of claim 1, wherein the energy storage element comprises an inductor.

10. The voltage regulator of claim 1, wherein the controller comprises:
    a comparator to compare the indication to at least one threshold and generate a signal to control a duty cycle of the switch based on the comparison.

11. The voltage regulator of claim 1, further comprising:
    a driver circuit to couple the controller to said at least one switch.

12. A method for use with a voltage regulator, comprising:
    cycling energy through an energy storage element pursuant to switching cycles, each switching cycle including an on time interval to energize the energy storage element and an off time interval to de-energize the energy storage element; and
    comparing an indication of an output voltage of the regulator with at least one threshold; and
    based on the comparison, regulating both a duration of the on time interval and a duration of the off time interval without referencing a switching signal having a predefined frequency.

13. The method of claim 12, wherein the act of cycling comprises:
    selectively coupling at least one switch between the energy storage element and an energy source.

14. The method of claim 12, wherein said at least one threshold comprises an upper threshold indicative of a desired maximum voltage level for the output voltage.

15. The method of claim 14, wherein the act of cycling comprises:
    the energy storage element when the output voltage is above the desired maximum voltage level.

16. The method of claim 12, wherein said at least one threshold comprises a lower threshold indicative of a desired minimum voltage level for the output voltage.

17. The method of claim 16, wherein the act of cycling comprises:
    de-energizing the energy storage element when the output voltage is below the desired minimum voltage level.

18. The method of claim 12, further comprising:
    sampling a current in the energy storage device to furnish said at least one threshold.

19. A computer system comprising:
    an energy storage element to produce an output voltage;
    a processor to receive the output voltage;
    at least one switch to energize and de-energize the energy storage element pursuant to switching cycles, each switching cycle including an on time interval during which said at least one switch operates to energize the energy storage element and an off time interval during which said at least one switch operates to de-energize the energy storage element; and
    a controller coupled to said at least one switch and adapted to:
       receive an indication of the output voltage, and
       regulate both a duration of the on time interval and a duration of the off time interval based on the indication of the output voltage without referencing a switching signal having a predefined frequency.

20. The computer system of claim 19, wherein the controller comprises:
    a comparator to compare the indication to at least one threshold and generate a signal to control the switch based on the comparison.

21. The computer system of claim 20, wherein said at least one threshold comprises an upper threshold indicative of a desired maximum voltage level for the output voltage.

22. The computer system of claim 21, wherein the signal controls said at least one switch to energize the energy storage element when the output voltage is above the desired maximum voltage level.

23. The computer system of claim 20, wherein said at least one threshold comprises a lower threshold indicative of a desired minimum voltage level for the output voltage.

24. The computer system of claim 23, wherein the signal controls said at least one switch to de-energize the energy storage element when the output voltage is below the desired minimum voltage level.

25. The computer system of claim 20, further comprising:
a circuit to sample a current in the energy storage device to furnish said at least one threshold.

* * * * *